Figure 5:
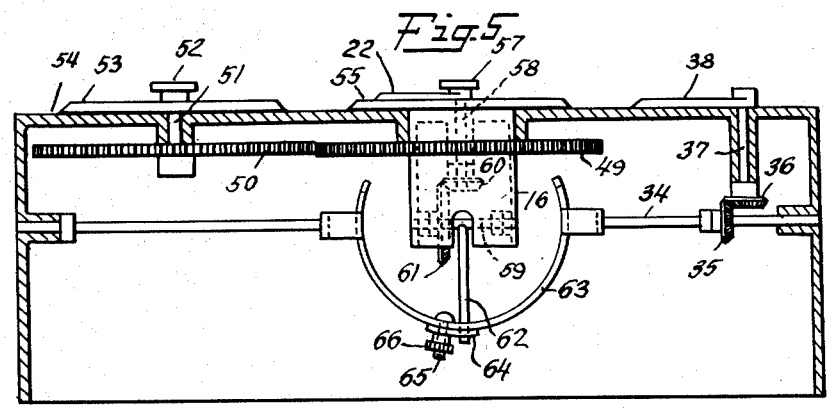

May 18, 1937.  N. SINITZIN-WHITE  2,080,587
CALCULATING DEVICE
Filed March 21, 1935  2 Sheets-Sheet 1
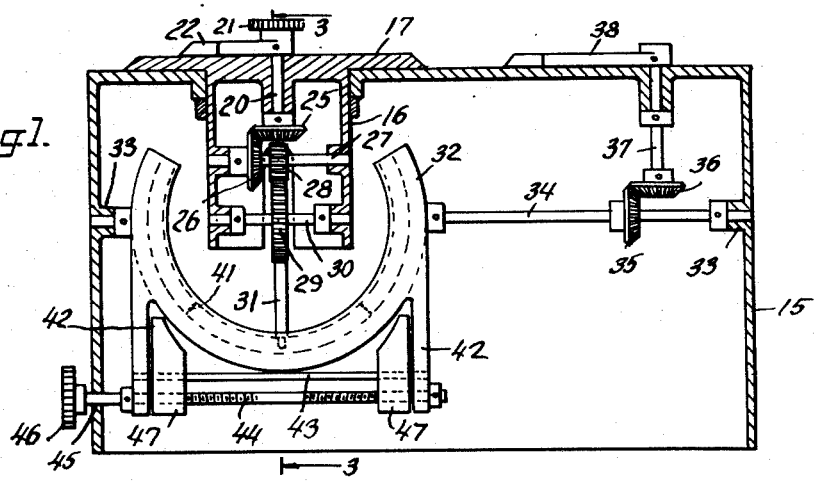
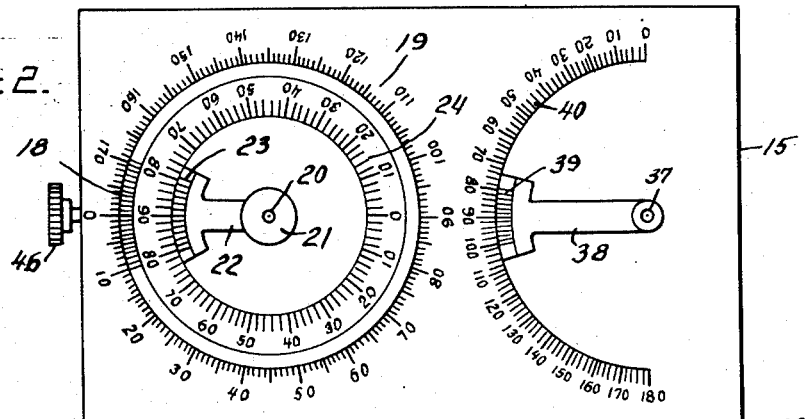
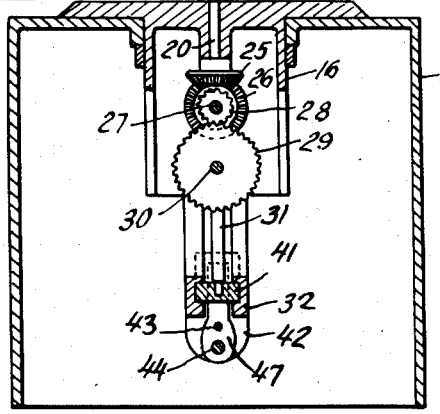
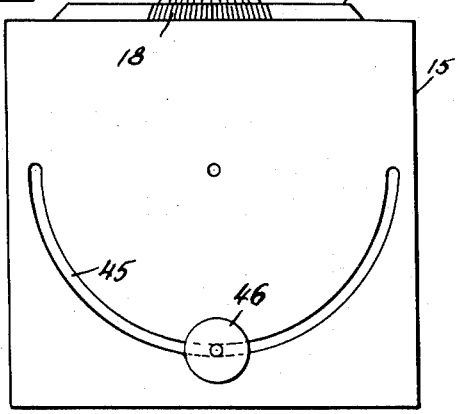
INVENTOR
N. Sinitzin-White
BY
Pennie Davis Marvin & Edmonds
ATTORNEYS May 18, 1937.  N. SINITZIN-WHITE  2,080,587
CALCULATING DEVICE
Filed March 21, 1935  2 Sheets-Sheet 2

INVENTOR
N. Sinitzin-White
BY
Pennie Davis Marvin & Edmonds
ATTORNEYS

Patented May 18, 1937

2,080,587

UNITED STATES PATENT OFFICE 2,080,587

CALCULATING DEVICE

Nicholas Sinitzin-White, Bridgeport, Conn., assignor of one-third to John L. R. Glover, Fairfield, Conn., and one-third to Nicholas N. Solovioff, Milford, Conn.

Application March 21, 1935, Serial No. 12,224

8 Claims. (Cl. 33—1)

This invention relates to calculating devices and more particularly to an apparatus for use in celestial navigation for determining the position of a ship, airplane or the like.

In determining the position of a ship, the altitude and azimuth of a celestial body are determined from the known factors which include the hour angle and declination of a celestial body and the dead reckoned latitude of the observer. The first two factors may be obtained from an almanac or similar available data and the latter is approximated by applying to the last known position the run that has since been made and finding a new dead reckoning position. Having these three known factors the two unknowns may be mathematically calculated.

The mathematics involved in the calculation of the two unknowns to determine the position of an observer on or above the earth's surface by observation of a celestial body is complicated and requires time for calculation. Various tables have been provided for the purpose of simplifying these calculations but the use of these tables is open to many objections. It has also been proposed to employ certain instruments by means of which various dials and the like may be set to correspond to the known values and the unknowns may then be read from other dials on which the unknown values are indicated by the movement of the dials corresponding to the known values. The instruments which have heretofore been provided for this purpose are open to several objections, the most general of which is the complexity of such devices. Instruments heretofore provided have consisted of five movable dials or arcs corresponding to the five values including the three known values and the two unknown values to be determined.

In the present invention I have provided an instrument consisting of three movable members. Two of these members are moved an amount corresponding to two of the known values and the members are so interconnected that the third member will be moved to a new position by the movement of each of the other members. The members are then locked together and the third member moved an amount corresponding to the third known value by means of a scale or dial associated therewith. When the members are locked together the movement of the third member causes such a movement of each of the other two members and the two unknowns are then obtained from dials associated with the first two members.

Figure 6:
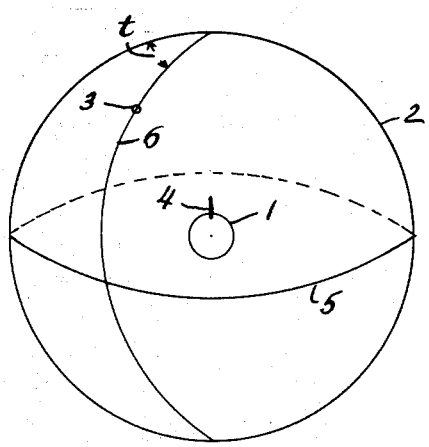
Figure 7:
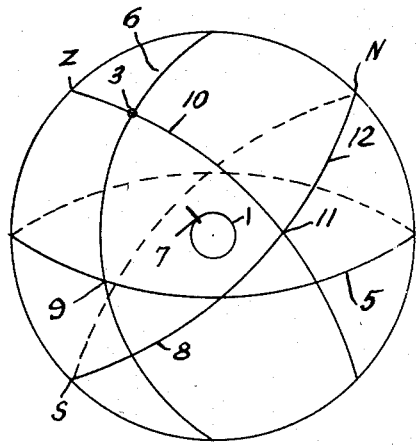

In the accompanying drawings I have shown several forms of the device. In the drawings:

Fig. 1 is a vertical, sectional view of one form of the instrument;
Fig. 2 is a plan view;
Fig. 3 is a vertical, sectional view on line 3—3 of Fig. 1;
Fig. 4 is an end elevation;
Fig. 5 is a vertical, sectional view of another form of the invention;
Fig. 6 is a view of the celestial sphere showing a celestial body and the earth in one position with respect to each other, when the observer is located on the pole;
Fig. 7 is a similar view showing the earth or the position of the observer in a different latitude; and
Fig. 8 is a plan view of the celestial sphere looking downwardly from the zenith of the observer's position and showing the relative positions of the celestial body corresponding to Figs. 6 and 7.

Figure 8:
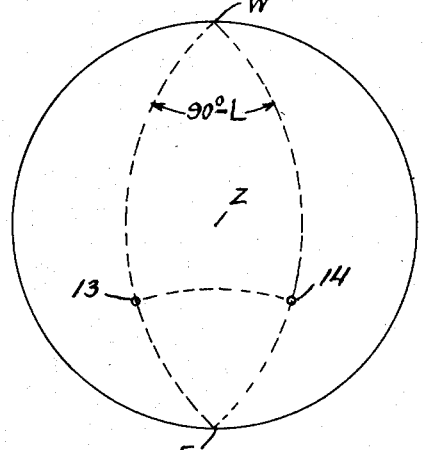

The operation of the instrument will be best understood by first considering the problem as illustrated in Figs. 6 to 8 of the drawings. Referring to Fig. 6 in which the reference numeral 1 designates the earth surrounded by the celestial sphere 2 in which a celestial body 3 is located, if we imagine the observer located at the pole, as indicated by the reference numeral 4, the horizon and the celestial equator will coincide and are represented by the circle 5. The hour angle $t$ of the celestial body is the angle between the zero meridian and the meridian 6 on which the body is located. With the observer at the pole the hour angle and azimuth will coincide, and may be measured by angle $t$. Likewise, inasmuch as the horizon and the celestial equator are now in the same position, the declination of the celestial body will be equal to its altitude over the horizon.

In Fig. 7 of the drawings the position of the observer has been moved from the pole to a latitude L° (less than 90°) as indicated by the reference numeral 7. This changes the position of the horizon so that it no longer coincides with the celestial equator, the celestial equator being represented by the reference numeral 5 as in Fig. 6 and the horizon being represented by the reference numeral 8. The azimuth of the celestial body, or the direction which it bears from the observer, has also been changed so that it no longer coincides with the hour angle which is a value unaffected by the change in the observer's position and the declination no longer coincides with or is the same as the altitude above the horizon. Thus in Fig. 7 the meridian of the observed body 3 intersects the celestial equator 5 at the point 9 and the arc 3—9 is the declination of the observed body, whereas arc 10 from the observer's zenith z intersects the horizon at the point 11 and the altitude of the celestial body is the arc 3—11. The azimuth is the angle z represented by the arc 12 of the horizon between the point 11 and N.

The change in values obtained by the movement of the position of the observer from the pole of the earth to another latitude is also shown in plan view in Fig. 8 of the drawings. In this figure the zenith is represented by the center of the circle which represents the horizon. The position of the celestial body with reference to the horizon when the observer is on the pole, as shown in Fig. 6 is designated by the reference numeral 13. The position of the celestial body with reference to the horizon when the observer is at latitude L° as shown in Fig. 7 of the drawings, is represented by the reference numeral 14. With the celestial body in the position represented in Figs. 6 and 7 and the observer in the two positions represented in Figs. 6 and 7, a ray from the center of the earth to the celestial body bears a different relation to the observer as shown in Fig. 8. The adaptation of mechanical means for representing this change in position can be accomplished by imagining that the ray rotates with an imaginary semi-circle passing through the points east, zenith and west in Fig. 8. If I imagine that this semi-circle is rotated until its apex reaches the pole, or through an angle equal to 90° minus L°, the changes may be recorded by means of the apparatus shown in Figs. 1 to 5.

Referring to Fig. 1 of the drawings, the reference numeral 15 designates a suitable casing. A drum 16 is rotatably mounted in this casing and this drum carries a plate or disc 17 on its exterior which is provided with a suitable vernier 18. This vernier is associated with a circular indicator 19 divided into degrees and fractions thereof as shown. The vernier 18 and circle 19 may be designated as the hour angle vernier and hour angle circle and in calculating, the known hour angle value is set by rotating the disc 17 and the drum a distance corresponding to the known value of the hour angle. A shaft 20 extends through the disc 17 and is provided with an operating handle 21. This shaft carries a pointer 22 having a vernier 23 adapted to cooperate with a circular scale 24 formed on disc 17. The vernier 23 and the circular scale 24 are the declination vernier and declination scale.

Shaft 20 is provided with a bevel gear 25 meshing with a similar bevel gear 26 carried by a shaft 27 mounted in the drum at right angles to the axis thereof. This shaft in turn carries a pinion 28 meshing with a gear 29 carried by a shaft 30 mounted in the drum parallel to the shaft 27. An arm 31 is secured to the gear 29 radially thereof. The end of this arm is received in a semi-circular member 32 mounted in suitable bearings 33 in the casing at right angles to the axis of the drum 16. As shown, the semi-circular member 32 is connected to a shaft 34 that rotates with it. This shaft carries a bevel gear 35 meshing with a bevel gear 36 carried by a shaft 37 extending through the top of the casing. The shaft 37 is provided with an arm or pointer 38 having a vernier 39 cooperating with a semi-circular scale 40 on the top of the casing divided into degrees and fractions thereof. The vernier 39 and the scale 40 are the latitude vernier and the latitude circle.

Under certain conditions the arm 31 is movable in the member 32 and under certain conditions it is necessary to lock these parts to prevent independent movement. The means for accomplishing this is shown in Figs. 1 and 3 of the drawings. As shown, the semi-circular member 32 is substantially channel-shaped and receives an arcuate block 41 which is carried on the end of the arm 31 and in which arm 31 is free to rotate. A frame formed of two members 42 is carried by the semi-circular member and moves therewith. These members may be connected by a member 43. A shaft 44 is mounted in this frame and extends through a semi-circular slot 45 in the side wall (see Fig. 4) to permit movement of these parts when the semi-circular member is moved in its bearings. A knob or handle 46 may be arranged on the end of the shaft 44 to permit rotation thereof. The opposite ends of the shaft are oppositely threaded and blocks 47 are mounted on the shaft and internally threaded. When the knob 46 is rotated the blocks may be moved and caused to engage the arcuate block 41 to frictionally force the arcuate block 41 against the semi-circular member 32 and prevent relative movement of these parts.

The apparatus shown in Fig. 5 is substantially the same as that heretofore described except that the hour angle vernier and circle are separated from the declination vernier and circle. As shown, the drum 16 may be provided with an external gear 49 meshing with a gear 50 carried by a shaft 51 projecting through the top of the casing and having an operating knob 52. A disc 53 is carried by this shaft and is provided with a vernier upon its edge (not shown) adapted to cooperate with a circular dial divided into degrees similar to the dial 19 and arranged at the top of the casing as at 54. It will be apparent that rotation of the knob 52 and its associated parts will rotate the drum 16 in exactly the same way as the drum is rotated by the rotation of the disc 17, in the form shown in Figs. 1 to 4. The declination disc 55 is arranged on the top of the casing and connected to the drum 16. Arm 22 carrying the declination vernier cooperates with this disc. It is operated by a handle 57. In place of the shafts 27 and 30 and the associated gearing shown in Fig. 1, the shaft 58 of the declination disc may be geared directly to shaft 59 mounted in the drum at right angles to and intersecting the axis of the drum by bevel gears 60 and 61. An arm 62 corresponding to the arm 31 in Figs. 1 to 4 of the drawings is arranged radially of the shaft and cooperates with a semi-circular member 63 corresponding to the semi-circular member 32. In this form of the invention I have also shown different means for locking the associated parts to prevent relative movement. The arm 62 extends through a slot in the semi-circular member 63 and carries a curved plate 64. This plate is provided with an opening for a screw 65 and is adapted to be tightened against the semi-circular member 63 by a nut 66.

Referring again to the change in the position of a ray from the center of the earth to a celestial body relatively to the observer's position, the point at which the shaft 31 or continuation thereof intersects the shaft 30 corresponds to the center of the earth and the outer end of the arm 31 in the semi-circular member 32 corresponds to or represents the celestial body. This is first positioned for a calculation or determination by rotating the drum 16 by means of the disc 17 and setting it corresponding to the hour angle. The declination of the celestial body is then set by rotating shaft 20 which causes further movement of the arm 31 and also moves the semi-circular member 32 and arm 38 on the latitude dial. The arm 31 is then locked to the semi-circular member 32 by rotating shaft 44. With the parts locked together the latitude arm 38 is moved an amount equal to 90° minus L°. This rotates the semi-circular member 32 on its bearings similar to the rotation of the imaginary semicircle represented by east, zenith and west in Fig. 8 of the drawings and due to the interlocking of the parts causes movement to be transmitted through the arm 31 and the drum 16 to the shaft 20 and the disc 17. The value which is thus obtained on the hour angle dial is the azimuth and the value obtained on the declination dial is the altitude of the celestial body corresponding to the "dead reckoning" latitude.

The apparatus has been described in the foregoing specification in connection with the solution of problems relating to celestial navigation and the determination of the position of a ship or other body on the earth's surface by the Sumner Line of Position Method. It will be apparent, however, that the invention can be used in the solution of other problems involving spherical triangles and the above description is therefore to be considered as illustrative rather than as restrictive.

It will also be apparent that other methods of gearing and the like can be employed for transmitting movements from the exterior movable members or indicators to the three component parts of the apparatus. In the drawings I have illustrated the simpler types of apparatus for accomplishing the results but it is apparent that many translational means may be employed and that in place of using verniers on a single movable member the movable parts of the apparatus could be connected, through suitable gearing and the like, to a plurality of dials to separately indicate degrees, minutes and seconds.

I claim:

1. Apparatus of the character described comprising a rotatable member adapted to be set in a position corresponding to the hour angle of a celestial body, a second member pivotally mounted on the axis of said rotatable member and movable therewith and independently rotatable and adapted to be set in a position corresponding to the declination of said celestial body, and an arc pivoted on an axis at right angles to the axis of said rotatable member, and adapted to be set in a position corresponding to the latitude of the observer whereby the azimuth and the altitude of the celestial body may be ascertained from the positions of said rotatable member and said second member.

2. Apparatus of the character described comprising a casing, a drum rotatably mounted in said casing, an indicating device on the exterior of said casing and connected to said drum, a shaft rotatably mounted in said drum transversely thereof and intersecting the axis of said drum, an indicator on the exterior of the casing secured to said drum and connected to said shaft to indicate the movement thereof, an arm connected to said shaft at the axis of said drum and extending radially therefrom, an arc journaled in the casing on an axis at right angles to the axis of said drum, and indicating means on the exterior of said casing connected to said arc to indicate the movement thereof, said arm being connected to said arc.

3. Apparatus of the character described comprising a casing, a drum rotatably mounted in said casing, an indicating device on the exterior of said casing and connected to said drum, a shaft rotatably mounted in said drum transversely thereof and intersecting the axis of said drum, an indicator on the exterior of the casing secured to said drum and connected to said shaft to indicate the movement thereof, an arm connected to said shaft at the axis of said drum and extending radially therefrom, an arc journaled in the casing on an axis at right angles to the axis of said drum, and indicating means on the exterior of said casing connected to said arc to indicate the movement thereof.

4. Apparatus of the character described comprising a casing, an hour angle dial, and a latitude dial on said casing, a movable member in said casing connected to said hour angle dial, a declination dial secured to said movable member, a second movable member in said casing connected to said declination dial, an arc pivotally mounted in said casing and connected to said latitude dial, said members and said arc being so connected to each other that when said hour angle dial and said declination dial are set corresponding to the hour angle and the declination of a celestial body and the complement of said latitude corresponding to the latitude of the observer is then added on the latitude dial the hour angle dial will be moved to a position corresponding to the azimuth of the celestial body and the declination dial will be moved to a position corresponding to the altitude of the celestial body.

5. Apparatus of the character described comprising a casing, an hour angle dial, and a latitude dial mounted on said casing, a drum rotatably mounted in said casing and connected to said hour angle dial, a declination dial secured to said drum, a second member pivotally mounted on the axis of the drum and connected to the declination dial, and an arc pivoted on an axis at right angles to the axis of said drum.

6. Apparatus of the character described comprising a casing, an hour angle dial, and a latitude dial on said casing, a drum rotatably mounted in said casing and connected to said hour angle dial, a declination dial secured to said drum, a shaft rotatably mounted on said drum transversely thereof and intersecting the axis of said drum, said shaft being connected to said declination dial, an arm connected to said shaft at the axis of said drum and extending radially therefrom, and an arc journaled in said casing on an axis at right angles to the axis of said drum and connected to said latitude dial, said arm being connected to said arc.

7. Apparatus of the character described comprising a casing, an hour angle dial, and a latitude dial on said casing, a drum rotatably mounted in said casing and connected to said hour angle dial, a declination dial secured to said drum, a shaft rotatably mounted on said drum transversely thereof and intersecting the axis of said drum, said shaft being connected to said declination dial, an arm connected to said shaft at the axis of said drum and extending radially therefrom, and an arc journaled in said casing on an axis at right angles to the axis of said drum and connected to said latitude dial.

8. Apparatus of the character described comprising a casing having a scale thereon, a dial rotatably mounted on the casing cooperating with said scale, a second scale rotatable with said dial, a dial cooperating with said second scale, an arcuate member rotatable on an axis, an element movable by one of said dials in a plane at an angle to the axis of said member and operatively connected to the member to move the member about its axis, means operated by the other dial for varying the angle made by said axis and the plane of movement of said element, a third dial on the casing operatively connected to said member, and a scale on the casing cooperating with said third dial.

NICHOLAS SINITZIN-WHITE.